(12) United States Patent
Schiffmann et al.

(10) Patent No.: US 6,915,068 B2
(45) Date of Patent: Jul. 5, 2005

(54) INTERLEAVE MODE FOR HELICAL SCAN RECORDING

(75) Inventors: Rolf Schiffmann, Mainz (DE); Henrikus Antonius Vaanholt, Modautal (DE); Rolf Hedtke, Darmstadt (DE)

(73) Assignee: Thomson Licensing, S.A., Boulogne (FR)

( * ) Notice: Subject to any disclaimer, the term of this patent is extended or adjusted under 35 U.S.C. 154(b) by 626 days.

(21) Appl. No.: 10/127,335

(22) Filed: Apr. 22, 2002

(65) Prior Publication Data

US 2003/0198459 A1 Oct. 23, 2003

(51) Int. Cl.⁷ .................................................. H04N 5/91
(52) U.S. Cl. ....................................... 386/129; 386/131
(58) Field of Search ............................ 386/46, 52, 67, 386/68, 129, 131

(56) References Cited

U.S. PATENT DOCUMENTS 4,901,161 A * 2/1990 Giovanella .................. 386/129
5,550,640 A * 8/1996 Tsuboi et al. ................ 386/35
5,758,013 A * 5/1998 Kizu et al. ................. 386/123
6,681,076 B1 * 1/2004 Ohishi et al. ................. 386/68

* cited by examiner

Primary Examiner—Huy Nguyen
(74) Attorney, Agent, or Firm—Joseph S. Tripoli; Francis A. Davenport; Jorge T. Villabon

(57) ABSTRACT

An improved utilization of the storage space on a helical scan recording and/or reproduction apparatus in particular according to the D6 format. In the case of a data transfer rate in which the apparatus recording rate corresponds to an integer multiple of the data transfer rate of data signals to be recorded, the recording is effected in a manner dependent on the ratio of apparatus recording rate to the data transfer rate by a corresponding first portion of the volume of data being written to first data frames (7) and, after corresponding rewinding, by the corresponding second portion of the volume of data subsequently being written to second data frames (8).

14 Claims, 4 Drawing Sheets

INTERLEAVE MODE FOR HELICAL SCAN RECORDING

FIELD OF THE INVENTION

The invention is based on an apparatus for helical scan recording and/or reproduction of digital data signals with a magnetic tape medium, and in particular, in accordance with ANSI/SMPTE Standards 277M and 278M, also known as the D6 format.

BACKGROUND OF THE INVENTION

A known area of application is commercial studio technology, where apparatus with the formats mentioned above are provided as video recorders for the helical scan magnetic tape recording of digital television signals in particular HDTV and are also used as data recorders. The recordings are used, e.g. in a film editing system, predominantly for saving data, also called backup, wherein relatively large data transfer rates have to be taken into account.

As represented diagramatically using a track configuration on the section of a magnetic tape 1 in FIG. 2, digital data signals, also called useful data below, are recorded in so-called clusters 2 by means of two groups of rotating write head arrangements 3a and 3b arranged on a head drum 4, shown in FIG. 3.

In accordance with the D6 format two write head clusters 3a and 3b ago comprise eight individual write heads R1–R8, plus a single erase head. Similarly two read head clusters 5a and 5b comprising eight individual read heads P1–P8, which can provide read after write or direct off-tape monitoring during recording. Consequently, eight parallel slanted tracks are written by each head group forming a cluster 2, with two clusters corresponding to a full head drum revolution. The number of clusters (2) for a frame depends on the respective video standard: for example, in the case of a 25 video frames per second standard, a total of twelve clusters (2), arranged next to one another are provided for the data of a video frame. In this case, two adjacent clusters (2) in each case form a segment 6 and six adjacent segments in each case form a data frame 7, 8.

For the interaction of drive by means of the servo devices thereof and the feeding and also processing of the useful data, the clusters 2 are assigned indexes which are formed as markings and are recorded as a longitudinal track 10 parallel to control track 11 on the magnetic tape 1.

In the event of a transfer rate of useful data fed to the apparatus which e.g. in the case of variation of the data processing speed within the film editing system is lower than the constant apparatus recording rate, the magnetic tape is utilized incompletely because affected locations are filled with dummy or non-usefull padding data in order to ensure a continuous data recording. The advantageous invention obviates the recording dummy data and therefor utilizes the magnetic tape more efficiently.

SUMMARY OF THE INVENTION

The invention is based on the idea that, in a data recorder for helical scan recording and/or reproduction and in particular using the D6 format at a constant recording speed, in a first pass, a corresponding first portion of the volume of useful data is recorded in the odd-numbered data frames on a magnetic tape and, at the end of the first pass, the magnetic tape is correspondingly rewound in order that, in a second pass, the second portion of the volume of useful data is recorded in the even-numbered data frames on a magnetic tape. However, it is to be assumed that the apparatus recording rate e.g. 100 Mbytes per second corresponds to twice the data transfer rate of the useful data to be recorded.

For the case where the apparatus recording rate corresponds to a larger integer multiple than twice the data transfer rate, however, a corresponding procedure can be adopted: e.g. in the case of a three-fold rate, according to the invention, useful data are in each case recorded in three passes with each corresponding third data frame.

The storage space available on the magnetic tape can advantageously be optimally utilized by means of recording arrangement called interleave mode below of digital data.

For the case where, however, the apparatus recording rate corresponds to a non-integer multiple of the data transfer rate and an adaptation of the data transfer rate is no longer expedient owing to an excessively large multiple of e.g. five then resulting from such an adaptation, the invention alternatively provides that the data signals are recorded in the manner known per se, namely only a single pass is provided for recording the useful data on the magnetic tape and dummy data are written to the useful-data-free or remaining regions that are no longer required during the recording of the respective data signal.

The invention furthermore has the advantage that it can be realized with relatively simple means such as, in particular, by corresponding supplementations and/or changes to software means that are present anyway for the drive control in conjunction with the useful data signal feeding and processing.

The data recorder according to the invention is based on a digital video recorder for HDTV employing the D6 format as described in ANSI/SMPTE Standards 277M and 278M SMPTE 277, 278 for recording general (i.e. not restricted to HDTV signals) data signals:

in a digital film editing application, the useful data are picture data, i.e. data files containing picture information of a picture. In this case, in contrast to a video frame (here the size of each frame is constant), the size of the picture file is dependent on the resolution (pixels per line and lines per picture are arbitrary) and the color depth (8 or 10 bits). In this case, moreover, each picture is an autonomous file.

In a further application, the data recorder can also record and reproduce general data such as e.g. hard disk contents with files of arbitrary size.

The use of a video recorder of this type as a basis for the data recorder according to the invention means that the data frame is the smallest unit that can be handled for the control of recording and reproduction of data.

In this connection, an exemplary film editing system will be employed of further illustration. In the exemplary system picture data has the following propertie, it is assumed that a film scene has a duration of 100 seconds with 24 pictures per second corresponding to 2400 pictures. It is assumed that the film frame is sampled with a resolution of 2048×1556 pixels in red green and blue, each with 10 bit sample quantization and is formatted with a DPX file format in accordance with ANSI/SMPTE Standard 268M. These exemplary system parameters thus produce a file size of approximately 12.7 Mbytes per picture, hence the entire scene comprises a volume of data of about 30.5 Gbytes.

If the data transfer rate of the channel is for example 100 Mbytes/sec, although the data would, without use of the inventive interleave mode, be able to be recorded also without a magnetic tape storage loss, the data transfer rate would only be about 50 Mbytes/sec due to computing power, reading speed of hard disks, etc., hence dummy data would be written to half of the magnetic tape of the D6 data recorder and thus half of tape recording duration would thus be wasted.

According to the invention, by means of the interleave mode, only every second data frame is written to in a first pass, so that the recorded data rate in accordance with the first pass is $$\frac{100 \text{ Mbytes/sec}}{2} = 50 \text{ Mbytes/sec.}$$

After rewinding the magnetic tape, in a second pass, further data are then written to the data frames which are thus still free, in which case the further data may e.g. also be data of other scenes as represented in FIG. 1 by second data frame 8 filled with picture data of a scene B. In other words, the data which are written in the second pass may be totally independent of the data from the first pass.

BRIEF DESCRIPTION OF THE DRAWINGS

The invention is explained in more detail with reference to a drawing, in which.

DETAILED DESCRIPTION

Figure 1:
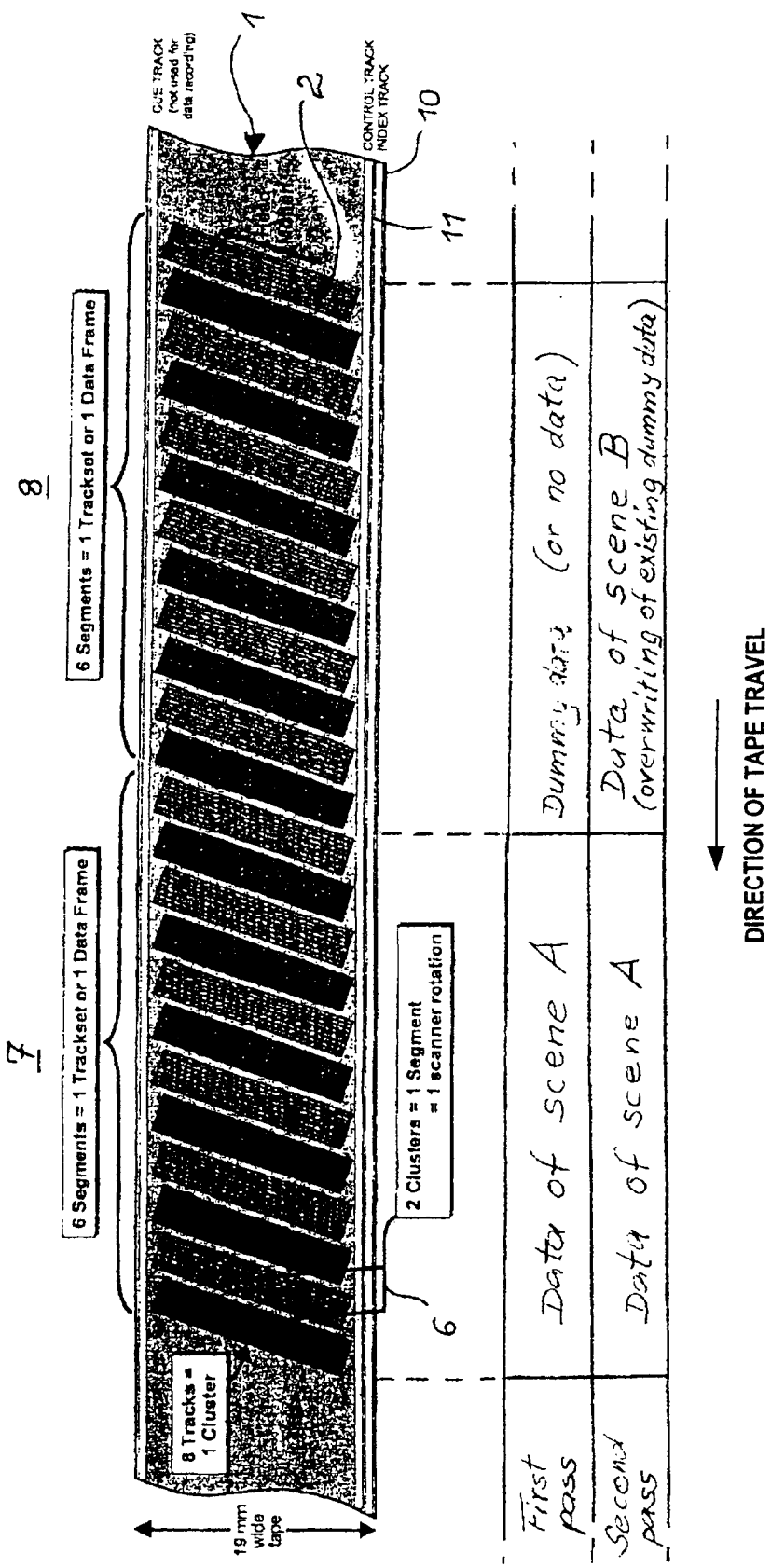
FIG. 1 shows a diagrammatic illustration of a magnetic tape section recorded according to the invention and shows two adjacent data frames.

FIG. 1 illustrates the inventive recording method using two data frames 7 and 8 recorded next to one another on magnetic tape 1. The data frames are called first (7) and second (8) data frame below, to illustrate the inventive arrangement for recording uncompressed digital data or digital television pictures, also called useful data for the sake of simplicity, on a tape type recording medium 1 corresponding to the D6 format of ANSI/SMPTE Standards 277M and 278M.

As already mentioned, in accordance with the D6 format, eight parallel slanted tracks in each case form a cluster (2), and two clusters (2) correspond to a full head drum revolution. Two adjacent clusters 2 in each case form a segment 6 and six adjacent segments in each case form a data frame 7, 8.

Figure 4:
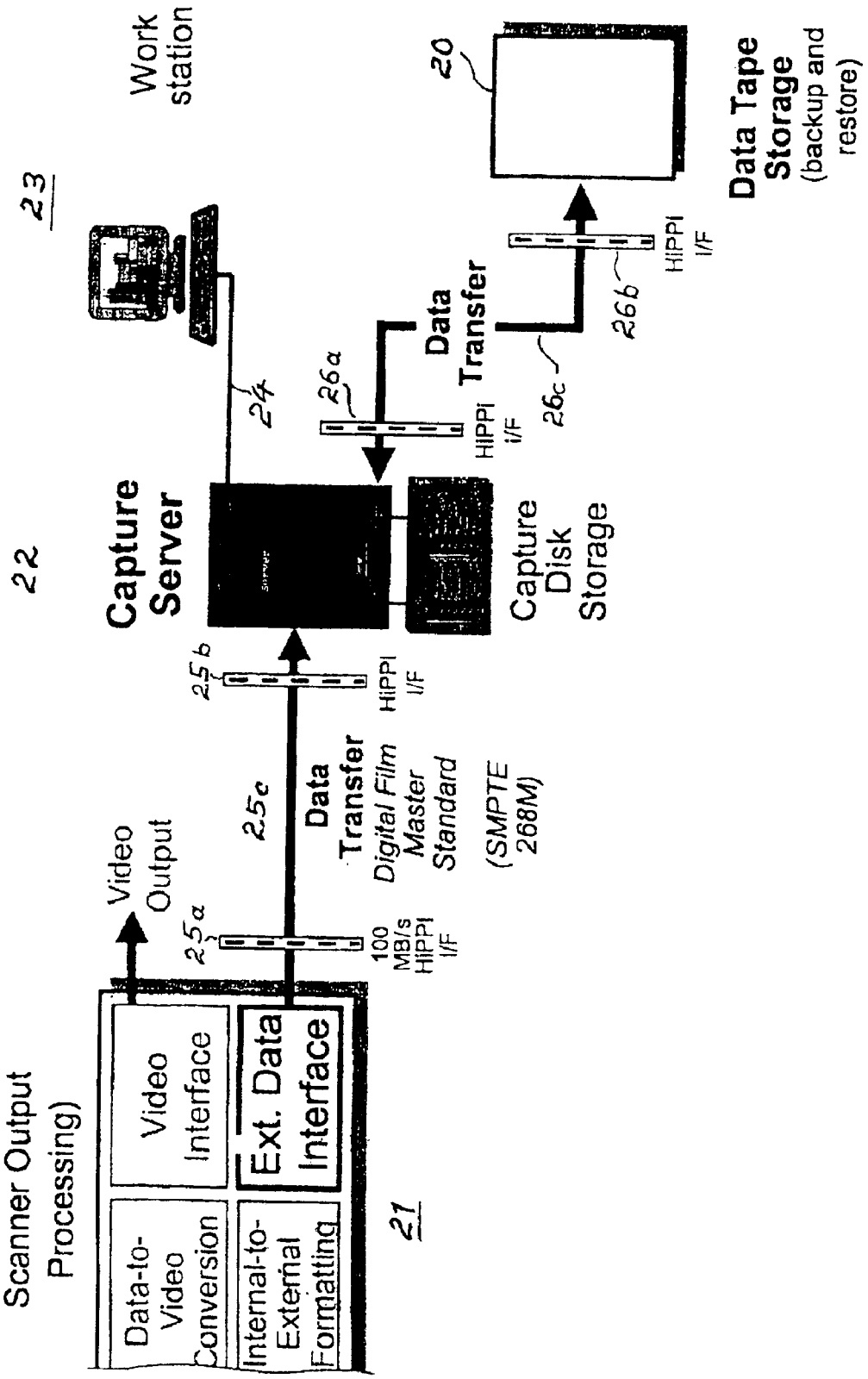
FIG. 4 shows a block diagram of a film editing system.

As represented by the data frames 7, 8 filled with picture data of a scene A and a scene B, according to the invention, at a constant recording speed, a corresponding portion of the useful data is recorded in the respective first data frame 7 in a first pass, while dummy data or non-useful data are recorded in the respective subsequent second data frame 8. The magnetic tape 1 is rewound at the end of the first pass in order to allow recording or overwriting in the areas of frame 8 previously written with non-useful data. The dummy data can be generated in a simple manner e.g. by a controllable data transfer device 22 as illustrated in FIG. 4.

For the interaction of the drive (not illustrated) and the feeding and also processing of the useful data, the clusters 2 are assigned indexes which are formed as markings and are recorded as a longitudinal track 10 parallel to the control track 11 of a control signal on the magnetic tape 1.

Figure 2:
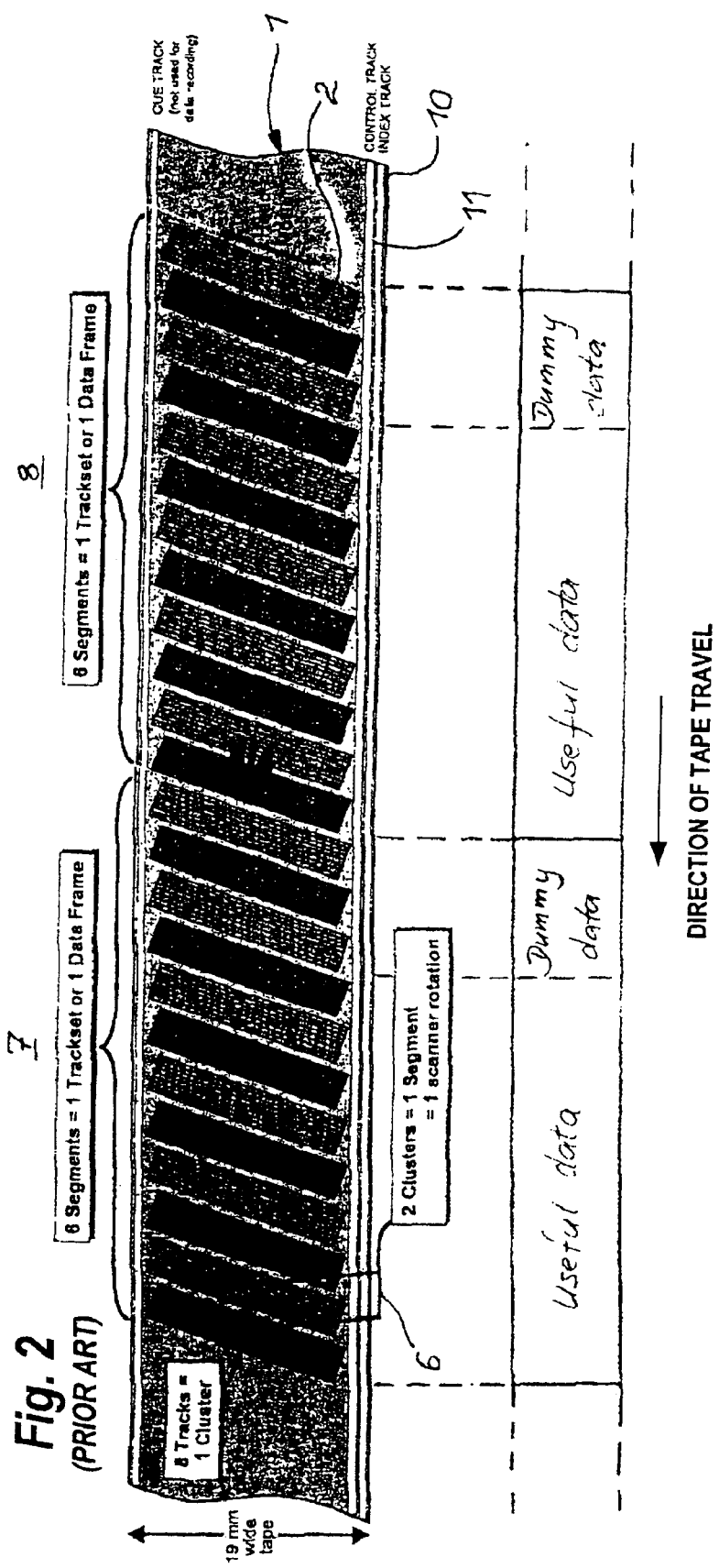
FIG. 2 shows a diagrammatic illustration of the magnetic tape section recorded in accordance with the standard and shows two adjacent data frames.

FIG. 2 shows a diagrammatic illustration of a magnetic tape 1 recorded according to a known arrangement for digital television pictures.

Figure 3:
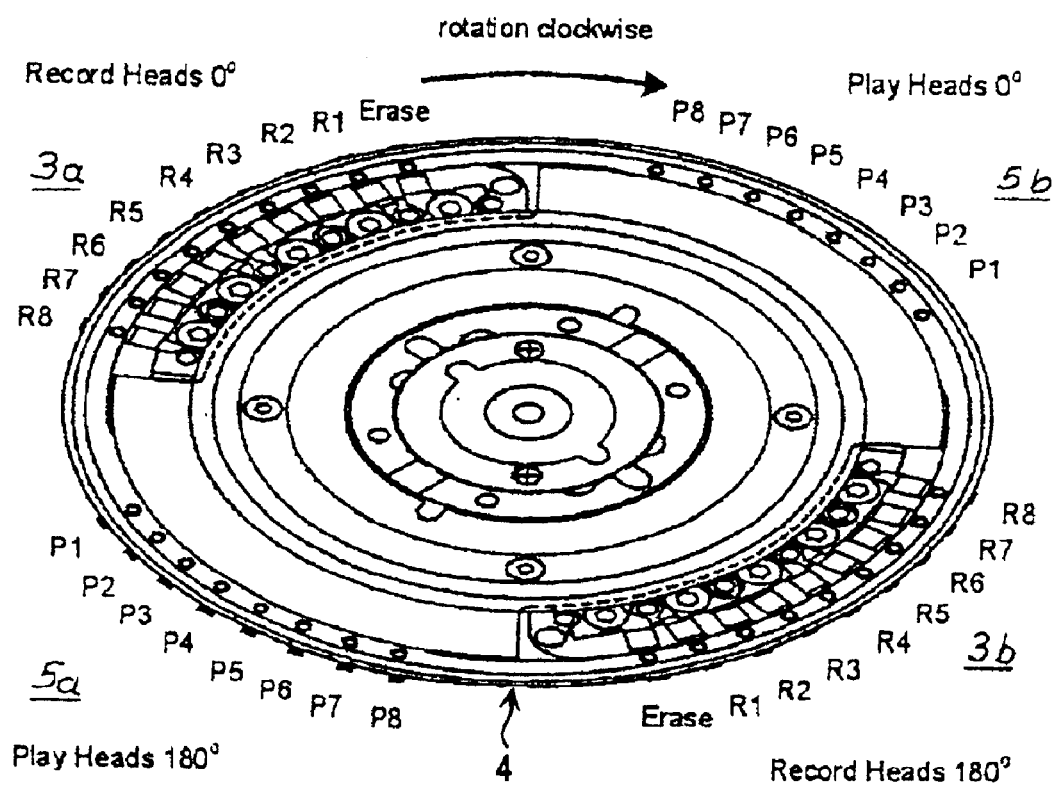
FIG. 3 shows a head drum with record replay and erase heads.

FIG. 3 shows the rotating part of the known head drum 4 as described in the introduction for recording and/or reproduction according to the invention of general digital data signals or digital television pictures in the case of the use of the data recorder according to the invention as a video recorder for HDTV.

FIG. 4 shows a simplified illustration of a film editing system which comprises, in addition to an advantageous data recorder 20 employed for the inventive helical scan recording and/or reproduction of digital data signals on tape medium 1, a film scanning device 21, a controllable data transfer device 22, essentially designed as a capture server, and also a computer-aided workstation 23, which, via corresponding data lines 24, controls the interaction of film scanning device 21 and data transfer device 22 with regard to the data recorder 20 and the recording medium 1 mounted e.g. in a tape cassette.

The data transfer device 22, which is arranged between film scanning device 21 and data recorder 20 with regard to the data signal flow, is connected to the film scanning device 21 and the data recorder 20 via corresponding interfaces 25a, 25b, 26a, 26b and data transfer means 25c, 26c, which may have e.g. amplifiers and/or data signal converters.

The workstation 23 includes monitor and input keyboard, via which a film editor can monitor and control recording and/or editing of useful data with the data recorder 20 in the above-described manner by determining e.g. which scenes of a film to be edited are recorded according to the invention by means of the interleave mode and whether, during editing, work will be effected with or without dummy data.

For control of the data transfer there is provided a so called PHANTOM Transfer Engine which is preferably realized by software means of the capture server 22. The PHANTOM Transfer Engine controls the data transfer from the film scanning device 21 to the capture server 22 and then in a separate step for backup of corresponding useful data to the data recorder 20. Furthermore, the PHANTOM Transfer Engine controls also loading of useful data recorded onto the magnetic tape 1 from the data recorder 20 to the capture server 22.

What is claimed is:

1. A method for helical scan recording digital data signals on a magnetic tape medium by means of write/read head groups arranged oppositely on a periphery of a rotating head drum, the method comprising the steps of;
    a) determining a data transfer rate of a first data signal to be recorded;
    b) recording said first data signal sequentially when said data transfer rate of said first data signal substantially corresponds to a recording rate of said apparatus;
    c) recording said first data signal alternatingly with sections of non-useful data signals when said recording rate of said apparatus corresponds to a multiple of said data transfer rate of said first data signal to be recorded; and,
    d) overwriting with a second data signal said sections of non-useful data signals when said recording rate of said apparatus corresponds to a multiple of a data transfer rate of said second data signal.

2. The method of claim 1, wherein said step d) includes the step of:
    e) rewinding said magnetic tape medium prior to alternatingly recording said second data signal.

3. The method of claim 1, wherein said step b) includes the step of:
   f) recording on said magnetic tape medium sequentially in odd and even data frames.

4. The method of claim 1, wherein said step c) includes the step of:
   g) recording on said magnetic tape medium in one of an odd and even data frames.

5. The method of claim 1, wherein said step d) includes the step of:
   h) overwriting the other one of said odd and even data frames.

6. The method of claim 1, wherein said step d) includes the step of;
   h) overwriting the other one of said odd and even data frames.

7. The method of claim 1, wherein said step c) said recording rate of said apparatus corresponds to a non-integer multiple of a data transfer rate of said first data signal, comprising the step of;
   j) recording said first data signal and said non-useful data signal sequentially in one of an odd and even data frame.

8. The method of claim 7, wherein said step J) additionally comprises the step of;
   k) recording said first data signal and said non-useful data signal sequentially in in accordance with said a non-integer multiple.

9. An apparatus for helical scan recording and/or reproduction of digital signals by means of rotary write/read head arrangements comprising:
   a controller for determining recording modes of said apparatus in accordance with a data transfer rate of data coupled for recording;
   where in a first condition, data coupled for recording having data transfer rate in substantial correspondance with an apparatus recording rate, said controller initiates a first recording mode where said data to be recorded is written on a recording medium continuously; and,
   where in a second condition said apparatus recording rate corresponds to an integer multiple of a data transfer rate of data coupled for recording, said controller initiates a second recording mode where a first part of said data to be recorded is written in first data frames and a second part of said data to be recorded is recorded in second data frames.

10. The apparatus of claim 9, wherein said controller initiates a third recording mode when said apparatus recording rate corresponds to a non-integer multiple of a data transfer rate of data coupled for recording.

11. A film editing system receiving and editing digital data scanned from film for helical scan recording and/or reproduction by a recorder, comprising
   a controllable data transfer device; and,
   a workstation for controlling said recorder to have at least two recording modes, wherein
      a first recording mode, a data transfer rate of useful data scanned from film for recording corresponds to a recording rate of said recorder, said workstation controls writing of said useful data to a recording medium to occur continuously; and,
      in a second recording mode, said recording rate of said recorder corresponds to an integer multiple of a data transfer rate of useful data scanned from film said workstation controls writing of a first part of said useful data to first data frames and subsequently controlls writing of a second port of said useful data to second data frames.

12. The apparatus of claim 11, wherein said second recording mode said workstation controls positioning of said recording medium for initiating writing of said second portion of said useful data to said second data frames.

13. The apparatus of claim 11, wherein said second recording mode said workstation controls writing of said first part of said useful data to only first data frames of first and second data frames alternately located on said recording medium.

14. The apparatus of claim 11, wherein said second recording mode said workstation controls writing of said second part of said useful data to only second data frames of first and second data frames alternately located on said recording medium.

* * * * *